United States Patent
Schmidt

(10) Patent No.: US 8,098,214 B2
(45) Date of Patent: Jan. 17, 2012

(54) METHOD FOR REMOTE TRANSFER OF DISPLAY DATA BETWEEN TWO COMPUTERS

(75) Inventor: Sebastian Schmidt, Weisendorf (DE)

(73) Assignee: Siemens Aktiengesellschaft, Munich (DE)

( * ) Notice: Subject to any disclaimer, the term of this patent is extended or adjusted under 35 U.S.C. 154(b) by 936 days.

(21) Appl. No.: 12/042,448

(22) Filed: Mar. 5, 2008

(65) Prior Publication Data
US 2008/0218431 A1    Sep. 11, 2008

(30) Foreign Application Priority Data
Mar. 5, 2007    (DE) .................... 10 2007 010 603

(51) Int. Cl.
*G09G 5/00*    (2006.01)
(52) U.S. Cl. ............................. 345/1.1; 345/4
(58) Field of Classification Search .............. 345/1.1, 345/4
See application file for complete search history.

(56) References Cited

U.S. PATENT DOCUMENTS

| 6,710,790 B1 | 3/2004 | Fagioli |
| 2003/0021476 A1 | 1/2003 | Di Federico et al. |
| 2006/0017845 A1 | 1/2006 | Onomatsu et al. |
| 2007/0088753 A1 * | 4/2007 | Omoto et al. .............. 707/104.1 |

FOREIGN PATENT DOCUMENTS
WO    WO 2006/051482    5/2006
* cited by examiner

*Primary Examiner* — Kevin M Nguyen
*Assistant Examiner* — Kenneth B Lee, Jr.
(74) *Attorney, Agent, or Firm* — Schiff Hardin LLP

(57) ABSTRACT

A method for exchanging image data with a number of image elements, which are respectively parameterized by a display value set, between a data source computer and a data query computer that each have a display device for the presentation of the image data, an input device for the input of control commands, and a data interface for the transmission and the reception of data via a remote data transfer network, including the steps: of copying image data on the data source computer and transmission to the data query computer, receiving the image data from the data source computer by the data query computer, and presentation of the image data on the display device of the data query computer, and these steps are repeated regularly or given alteration of image data. In order to selectively transfer among all data the public data but to have confidential data remain excluded from the transfer or at least the presentation on the receiving computer, the presentation of the image data is discriminated dependent on at least one of the display values in the display value set.

8 Claims, 4 Drawing Sheets

Data source computer DQR ⟶ Data query computer DAR

Data source computer DQR → Data query computer DAR

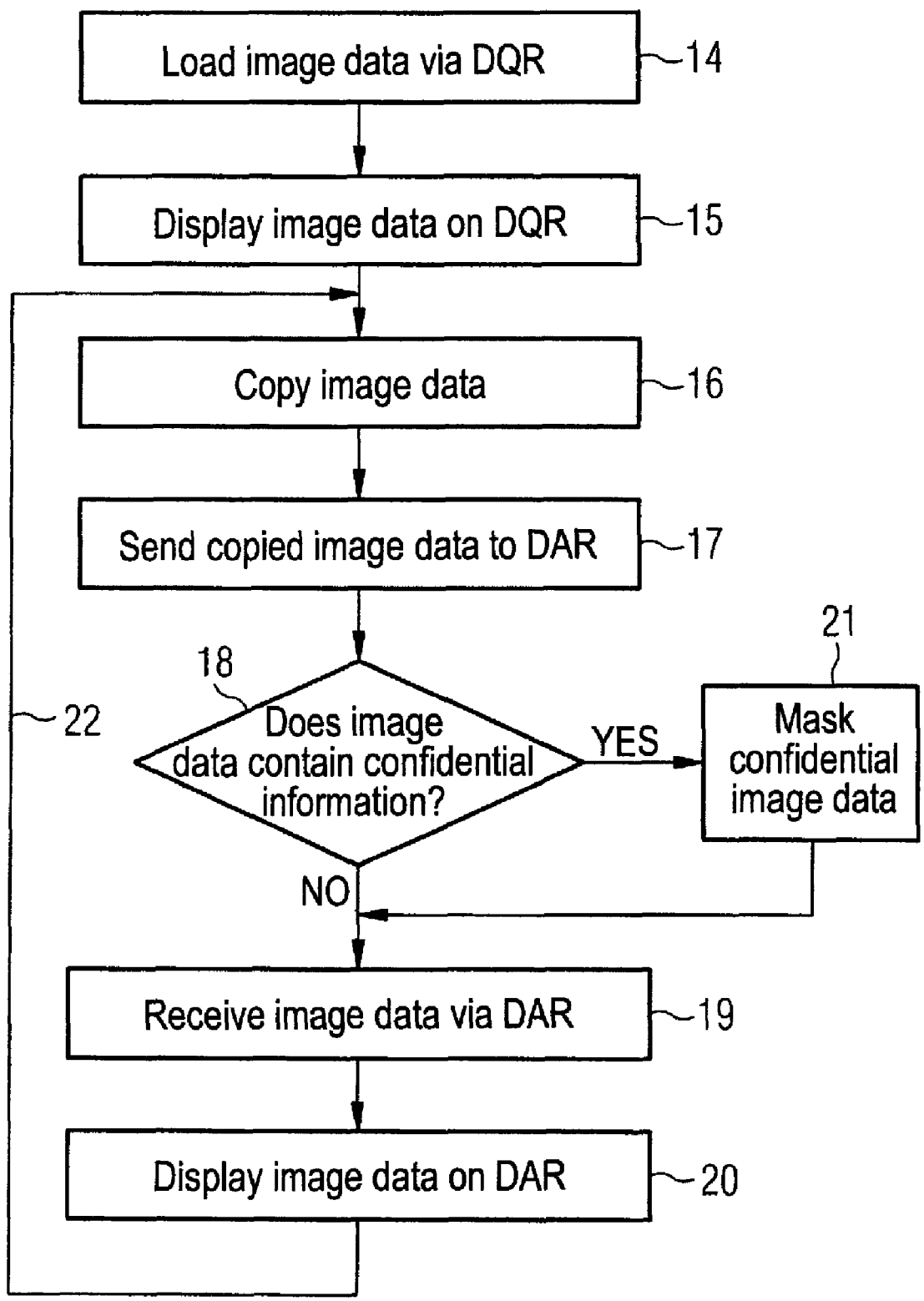

METHOD FOR REMOTE TRANSFER OF DISPLAY DATA BETWEEN TWO COMPUTERS

BACKGROUND OF THE INVENTION

1. Field of the Invention

The present invention concerns the remote transfer of display data between two computers in which public data must be differentiated from private data. The invention in particular concerns a method for exchanging image data composed of a number of image elements that are respectively parameterized by a display value set (for example HSL or RGB values).

2. Description of the Prior Art

Confidential patient data that must be protected from unauthorized access are normally located on the local control computers of medical technology apparatuses. This is particularly problematic given the remote maintenance (servicing) of one computer via another computer (known as remote administration in a computer network), which is becoming widespread. During such servicing, the patient data must thus be protected from access by the service personnel since otherwise a violation of the data protection exists. Sensitive data can be known only to the control program on the local computer, for example the patient browser of the software for the implementation of a magnetic resonance examination. For the remote service computer these data cannot be "visible" on the screen of the serviced computer.

However, the automatic concealment of the patient data on the service computer often fails because the known tools for remote maintenance of another computer (such as, for example, PC Anywhere (trade name of Symantec corporation) operate at the operating system level and essentially transfer the content of the screen buffer in a compressed form over the network.

Selective masking of the patient data is a possibility, but is made more difficult because where the patient data are situated on the screen is not known to the program for controlling the remote maintenance (known as the administration tool) and again it is not known to the local control program whether a remote access to the local computer ensues at a given moment, since both computers operate in a transparent mode in the remote servicing.

An obvious approach would appear to be to transfer the information contained in a data field to a remote maintenance computer or not depending on the position of said data field on the screen. The communication of coordinates on a screen to another computer is known. A method for mapping of screen contents of a local computer on a remote computer is known from U.S. Pat. No. 6,710,790, for example. This method according to the prior art for display of at least one part of a computer display of a remote computer in at least one part of a display device (wherein the part is defined by a movable display rectangle) includes the following steps. In the remote computer, a copy of the display image on the host computer is generated. A new active window notification is received from the host computer that specifies an active window rectangle. The active window notification corresponds to a part of the copy of the image on the display of the host computer. A determination is made as to whether the movable viewing rectangle intersects the rectangle of the active window. If it is detected in this determination that the movable viewing rectangle does not intersect the rectangle of the active window, the movable viewing rectangle is moved so that it intersects the active window rectangle.

In order to protect sensitive data with such a method, it would be necessary for sensitive and public data always to be displayed in a specific pattern on the screen. Such a provision represents a severe limitation and is too complicated to achieve in practice. All appertaining programs would have to be outfitted and retrofitted with corresponding interfaces.

By contrast, when the local control program is provided with an interface via which the program for the remote maintenance communicates to the local control program that an access has occurred (is occurring), the local control program can then black out the corresponding screen fields and show them again at the end of the access. This procedure has the disadvantage that the measurement workflow is thereby interrupted since the patient data are temporarily no longer displayed on the local control computer. This entails an interruption of the workflow. Furthermore, extensive changes to the local control program are necessary to set up such an interface that registers the establishment of a remote connection, and a complex dependency on the control program and the remote maintenance is produced, making further development of the system more difficult. Moreover, dependencies between program modules in the field of medical technology are particularly critical since any change to the management software or the local controller also forces changes of the other software, such that a new approval proceeding is necessary both for the new local control program and for the remote maintenance. This expenditure is in many cases disproportionate.

SUMMARY OF THE INVENTION

An object of the present invention is to provide a method with which, among all data, the public data can be selectively transferred, but data for which there exists a secrecy requirement remain excluded from the transfer, or at least from display on the receiving computer.

The basis of the invention is that a graphical feature of the queried data is used instead of coordinates in the local control program. With this graphical feature, regions that pertain to patient data to be kept secrete are marked on the screen. In order to allow a coordinate-independent filtering, those graphic parameters are used for marking that are provided along with the actual data for a corresponding presentation on a display given a transfer over a computer network. All data that exhibit the pre-established graphic parameters are filtered en route to the remote maintenance computer and the data to be kept secret are not displayed on the remote maintenance computer. The employed graphic parameters are advantageously not visible for the user.

The inventive method Is for exchanging image data (with a number of image elements that are respectively parameterized by a display value set) between a data source computer and a data query computer that each have a display device for the presentation of image data, an input device for the input of control commands and a data interface for the transmission and the reception of data via a remote data transfer network. The method includes the steps of copying image data on the data source computer and transmission to the data query computer, receiving the image data from the data source computer by the data query computer, and presenting the image data on the display device of the data query computer, and these steps are repeated regularly or given alteration of image data, and discriminating the presentation of the image data dependent on at least one of the display values in the display value set.

The display value set in particular concerns the color tone, the saturation and the brightness, and all image data whose color tone, saturation and brightness values lie in a predetermined range around a predetermined display value set are excluded from the transfer to the data query computer.

Alternatively, the display values can correspond to the RGB values and all image data whose R-values, G-values and B-values lie in a predetermined range around a predetermined display value set are excluded from the presentation on the data query computer.

In a further preferred embodiment of the invention, a fourth display value corresponds to a value for the transparency (alpha value), and all image data that exhibit a predetermined alpha value are excluded from the presentation on the data query computer.

With regard to the actual masking of the image data to be kept secret, the display value sets of all image data excluded from the presentation are advantageously replaced in the transmission by display value sets of image data that are adjacent to the image data excluded from the presentation.

In an alternative preferred embodiment, all those image data that lie within a closed curve (i.e., a closed boundary or outline) encompassing a predetermined display value set are excluded from the presentation on the data query computer.

The masking in this selection advantageously ensues in that the display value sets of all image data excluded from the presentation are replaced in the transmission by predetermined display value sets. The predetermined display value set in particular corresponds to a background color near an input field.

With regard to the selection of the optimal graphic parameters for the discrimination, for discrimination of the presentation of the image data a display value set is selected whose values do not occur in the image otherwise. This is easily possible given a parameter space of, for example, $2^{24}$ (approximately 16 million) values (i.e. a color depth of 8 bits), particularly as the human eye can only differentiate a few thousand colors of the visible spectrum. It is just as well possible to find a value that only slightly stands out to the eye. A particular color that otherwise does not occur on the screen can thus be used for the patient information. This can, for example, be achieved in that the "normal" font color is made lighter or darker by one brightness level in one of the three RGB components. Such a small difference is not recognizable for the user, but enables the corresponding discrimination of the presentation. Either the writing or the background color of the corresponding form field or both can be designated in this "special color(s)". The local control program is advantageously designed such that the "special color(s)" do not occur otherwise in the image. This is simple to effect in radiological apparatuses (which primarily show greyscale images) in that a "non-grey" color is selected, for example. The software on the remote service computer (remote management tool) is changed so that all image elements (pixels) with the special color are either replaced by the background color or writing and background are replaced by another color (blacking).

Among other things, the inventive method has the advantage that the screen regions that contain patient data are marked in a manner that is not recognizable for the user but is simple to identify for a remote maintenance. Only minimal adaptations to the remote maintenance are thereby necessary and the confidentiality of the information is ensured. The remote maintenance and the actual local controller moreover require no complex interfaces in order to exchange the information about the "critical" screen regions.

BRIEF DESCRIPTION OF THE DRAWINGS

FIG. 5 shows an exemplary embodiment of the inventive method for exchanging an image content containing both public and secret data between two computers.

DESCRIPTION OF THE PREFERRED EMBODIMENTS

In the following description the local computer that should be remotely maintained is designated as a data source computer (DQR) while the remote maintenance computer is designated as a data query computer (DAR). It is understood that the roles of the data source and the data query can reverse during one and the same maintenance session. In the following only a time period is considered in which the attributes source and query are unambiguous associated.

The invention is based on the fact that the graphical data are transmitted between the computers with display values (DZ) as parameters. According to color protocols, at least three display values are necessary for a complete color identification.

Figure 1:
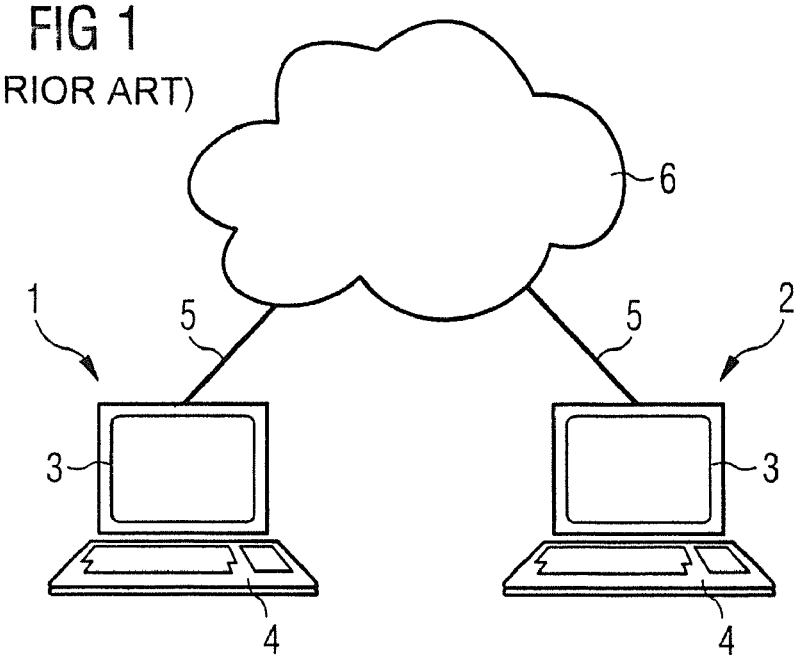
FIG. 1 shows an example for two computers that communicate according to the prior art via a remote data transfer network.

FIG. 1 shows the typical topology of a computer system with two computers 1 and 2 that are connected with one another via a remote data transfer network, for example a TCP/IP network. The first computer 1 is designated in the following as a local computer or, respectively, data source computer (DQR). The second computer 2 that is connected with the first computer 1 via the remote data transfer network 6 is designated as a data query computer (DAR). Each of the computers 1 and 2 has a display device 3 on which the image data can be presented. Each also has an input device 4 via which control commands can be entered in the computers 1 or 2, for example in order to load data from a database (not shown) or to establish or terminate a communication connection with another computer. Each of the two computers 1 and 2 also has an interface 5 for the transfer of data for the communication with other computers (in particular via the remote data transfer network 6). These data can be data that are also presented on the display device 3 at one of the two computers 1 and 2 and that are copied and sent for presentation in the same or a similar form on the screen 3 of the respective other computer 1 or 2.

Figure 2:
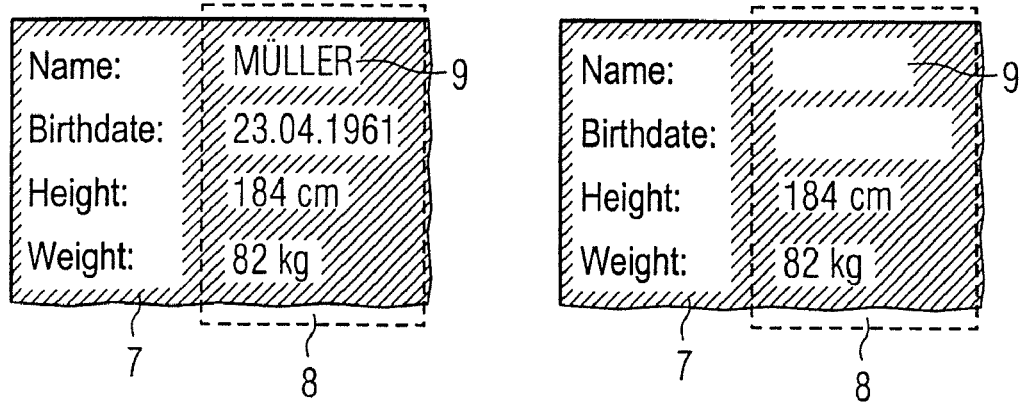
FIG. 2 shows a first embodiment for the presentation of patient data on a data source computer and a data query computer in accordance with the inventive method.

A section 7 of a display screen for both the DQR and the DAR is shown in FIG. 2. For example, patient data that were input via the input device 4 or that were loaded from a database onto the screen 7 are displayed on the display screen 7 of the DQR. In the shown embodiment these are the name, birthday, height and weight of a patient. This information is shown in predetermined input fields 9. The input fields 9 represent the image data which should only be selectively accessible given a remote query and the discrimination of which is explained in the following. The relevant image data that should be selectively communicated are located in a group 8 of input fields 9. The group 8 is outlined by a dashed box. Only anonymized data should be visible given a maintenance, meaning that information regarding the identity of a patient must be masked out or, respectively, remain excepted from the transmission of the DQR to the DAR.

The corresponding presentation of the section 7 on the DAR is shown in the right half of FIG. 2. While all fields appear filled out at the DQR (insofar as the data were input or, respectively, present in the database), the first two input fields 9 remain empty in the DAR so that name and birth date of the patient remain anonymous. This discrimination of the two first data fields 9 is inventively achieved in that the data that are presented with a predetermined set of three display values in the input fields 9 on the DQR are intentionally not presented when this set is identical with a predetermined set of display values. All data with other display values are displayed without their display values being altered.

Two different groups initially offer themselves as display values. In a first embodiment of the inventive method, the three display values correspond to the color tone, the saturation and the brightness. These are the values using which the human eye perceives colors (HSL color model for "hue, saturation, luminance"). These values are digitized and respectively represented on a scale between 0 and 255, for example. A value triple for color tone, saturation and brightness is thus obtained in which each value lies between 0 and 255. The color tone value depends on the position in the color circle and increases in the color circle of the color selection starting at the top and proceeding counter-clockwise, such that red at the top corresponds to the value 0 and orange, yellow, green, blue violet and red follow afterwards. The saturation (purity or intensity of the color) indicates the grey proportion of the color and increases from 0 (very grey) to 255 (fully saturated color). The brightness (perceived quantity or, respectively, intensity of the light in the color) lies between 0 (no light or, respectively, black) and 255 (full brightness or, respectively, white). The color is viewed as pure at 50% brightness, thus a value of 128.

All image data that exhibit a predetermined color tone value, saturation value and brightness value are excluded from the presentation on the data query computer 2. For example, if the characters are presented in pure red with color tone 255, saturation 255 (100%) and brightness of 128 (50%), the characters are masked out. Contrary to this, if the characters are presented in pure blue with color tone 170, saturation 255 and brightness 128, they are transmitted and displayed on the DAR.

Further encodings can be used as an alternative to the display values with color tone, saturation and brightness. In particular the RGB code with the colors red, green and blue (RGB color model) can be used. In the RGB model the writing in pure red has the R, G B values 255, 0, 0 and would be masked out in the above example. The writing in pure blue would correspondingly have 0, 0, 255 and would be shown on the DAR in the above example. Only these predetermined display value triples are discriminated; all other value triples are relayed unchanged to the DAR and displayed.

It is clear that naturally not only must the characters as such be masked out (i.e. be replaced by a different display value triple) but the entire input field is colored [sic]. This is explained in the following using FIG. 4.

Figure 4:
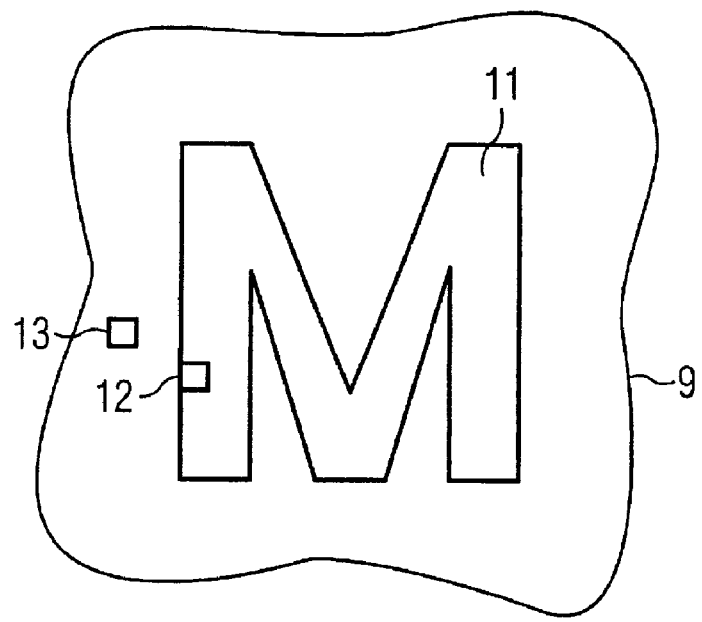
FIG. 4 shows the basic image elements for determination of a replacement display value set as parameters for explanation of the inventive method.

In FIG. 4 the letter "M" is shown as a character 11 that is presented as one among many in an input field 9 and that should be excluded from the display on the DAR. The display in the input field 9 is made up of many individual pixels. Of these pixels, some are located within the character 11. Of these one pixel is presented as a pixel 12. Other pixels are located within the input field 9' however outside of the character 11. Of these, one pixel is presented as a pixel 13. If the discrimination rule now applies to the character 11 (meaning that in the above example (H, S, L)=(255, 255, 128) is found as a display value triple for the pixel 12), a "neighboring" pixel is sought by the method that exhibits a non-discriminated display value triple. The pixel 13 is such a pixel. The display value triple of the pixel 12 is subsequently overwritten with the display value triple of the pixel 13. This ensures that the characters to be discriminated on the DAR adopt the same color etc. as their immediate surroundings and therewith can no longer be identified.

Figure 3:
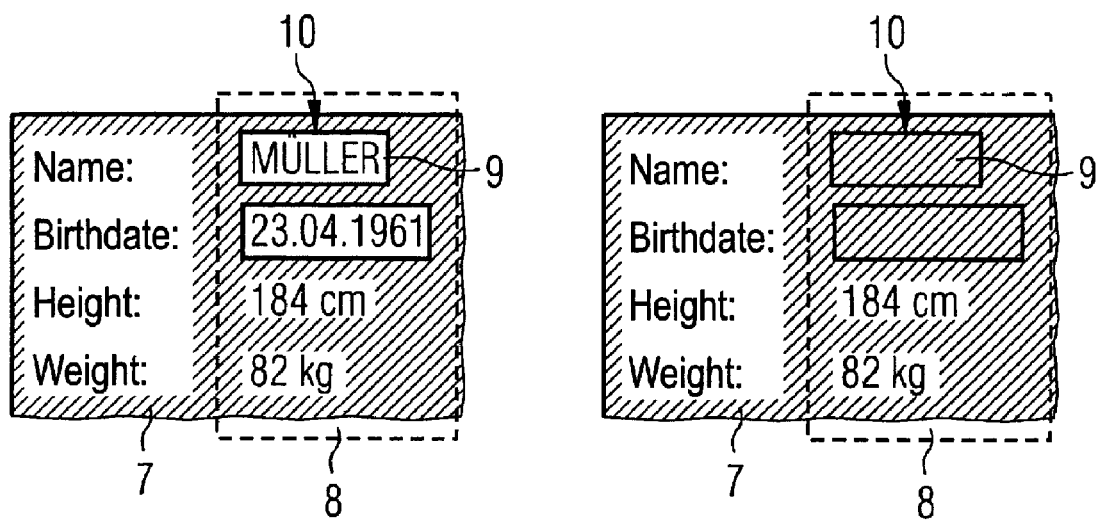
FIG. 3 shows a second embodiment for the presentation of patient data on a data source computer and a data query computer in accordance with the inventive method.

An alternative type of masking of characters to be discriminated is shown in FIG. 3. In this case each input field 9 (however at least every input field 9 to be discriminated) exhibits a border 10. If the content of the input field 9 should remain masked out given the transfer from the DQR to a DAR, a corresponding display value triple is assigned to the border 10 of the respective input field 9. In the embodiment of the inventive method according to FIG. 3, upon detection that such a border is present all image elements that lie within the border 10 are globally overwritten with a display value triple, thus in particular with a display value triple that corresponds to the surroundings of the input field 9 (as is also indicated in FIG. 3). There the background of the input mask 7 on the DQR is cross-hatched with the exception of the input fields 9. By contrast, on the DAR the two input fields 9 with the image data 8 to be discriminated are also cross-hatched, i.e. presented with the same background as the surroundings of the input field. Instead of the surroundings of the input field 9, another color presentation for the new display value triple can also be selected just as well, for example black (i.e. (H, S, L)=(x, 0, 0) or (R, G, B)=(0, 0, 0). In both cases the input field 9 on the DAR is filled entire black.

The display specifications for each image element are not limited to three values. Instead of these, further values can be incorporated for the display. For example, the alpha channel is an extension of the color modules. An alpha value is thereby stored for each pixel in addition to its color value. The transparency of the color is described by the alpha channel. The RGB value is thus extended to an RGBA model (red-green-blue-alpha), meaning that there is a value quadruple instead of a value triple. When this fourth display value corresponds to a predetermined value, all image data that exhibit this predetermined alpha value are excluded from the presentation at the DAR.

The display types of the color information cited above can be comprised in a palette model in which the color value is represented by a single number. The corresponding color value is thereby determined in the graphics hardware using a table of color values and RGB triples (what is known as the palette).

The workflow of the method is explained in detail in the following using FIGS. 5 and 6A, 6B.

An exemplary embodiment for the method for transfer of screen data with sensitive content from one computer to another computer is displayed with its individual steps in FIG. 5. The relevant image data are loaded from the DQR in a first step 14. They are subsequently displayed on the screen of the DQR in step 15. The data are simultaneously copied in step 16 in order to subsequently send them to the requesting DAR. The image data are thereby checked (advantageously on the DQR) to the effect of whether they contain confidential information. If that is not the case, the data are relayed unfiltered and are received by the DAR in step 19 so that they can be displayed on the screen of the DAR in the subsequent step 20. By contrast, if it is established in step 18 that the image data contain confidential information, the image data with this information are masked out in step 21. After the step 21 the method jumps back to step 19.

After termination of this loop with the steps 16 through 20, the method jumps back to the copying of the relevant image data in step 16 and sending to the DAR in step 17. This iteration is conducted until all data to be presented have been transmitted to the DAR.

Figure 6A:
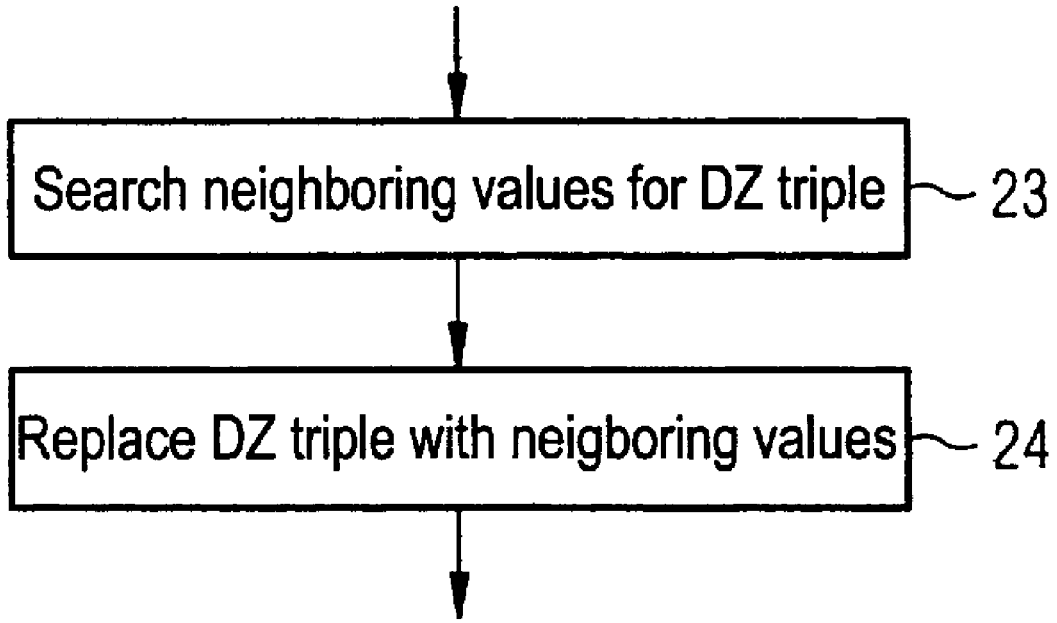
FIGS. 6A and 6B respectively show two exemplary embodiments for the exchange of present graphic parameters with replacement values in accordance with the present invention.

A first embodiment of FIG. 21 in FIG. 5 is presented in FIG. 6A. As already mentioned in FIG. 2 and FIG. 4, in step 23 different display value triples in the surroundings of a character to be masked out are sought for the display value triples to be replaced. The display value triples to be replaced are then overwritten with the found triples in step 24.

Figure 6B:
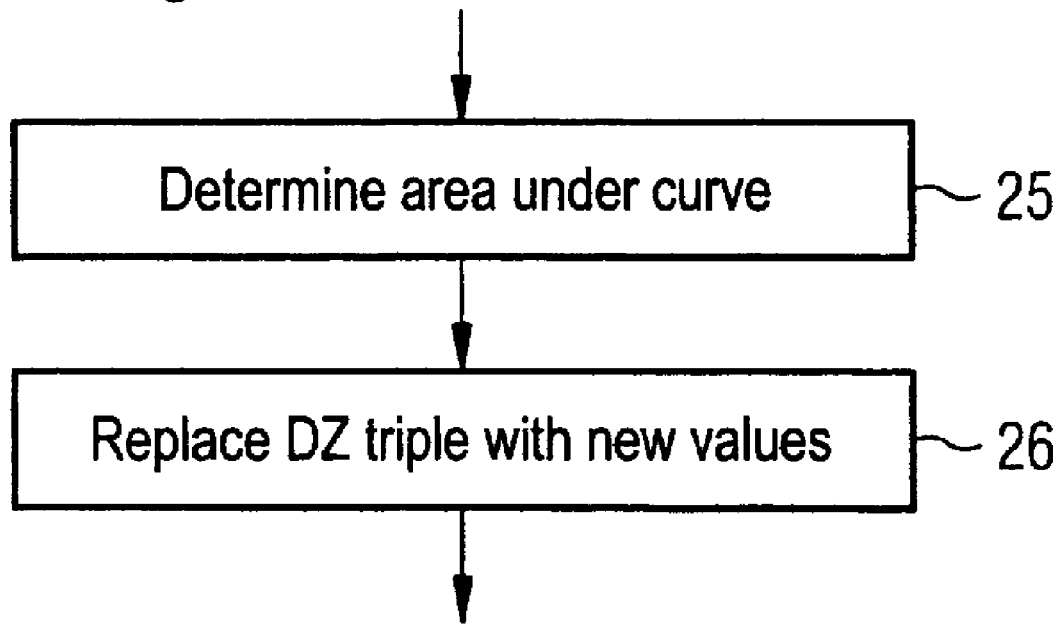

The corresponding workflow for the "blacking" of an entire input field (explained in FIG. 3) is shown in FIG. 6B. The area under the closed curve is initially determined in step 25. This means that all pixels are identified that lie within the border, independent of their actual display value triples. These display value triples are subsequently all overwritten with the same display value triple value.

While only a few values must be overwritten in the method according to FIG. 6A, the method according to FIG. 6B has the advantage that the algorithm for a global overwrite of display value triple values is simpler to implement.

In principle the masking of the image data to be discriminated can ensue both at the transmitter side and at the receiver side in the transmission. For secrecy maintenance reasons, however, this will advantageously ensue on the transmitter side.

When a particular color should be used for the patient information that otherwise does not occur on the screen, this can be achieved, for example, in that the "normal" font color is made lighter or darker by on brightness level in one of the three RGB components. Such a small difference is not recognizable for the user, but enables the corresponding discrimination of the presentation. Either the writing or the background color of the corresponding form field or both can thereby be marked in this "special color(s)". This is particularly simple to effect in radiological apparatuses (which primarily display greyscale images) in that, for example, a "non-grey" color is selected.

The alpha channel of the image information can be used just as well for discrimination when the employed graphics system supports such usage.

Although modifications and changes may be suggested by those skilled in the art, it is the intention of the inventor to embody within the patent warranted hereon all changes and modifications as reasonably and properly come within the scope of his contribution to the art.

I claim as my invention:

1. A method for exchanging image data between a data source computer and a data query computer, each of said data source computer and said data query computer comprising a display device for visual presentation of said image data, an input unit allowing entry of control commands, and a data interface for transmission and reception of data via a data transfer network placing said data source computer and said data query computer in communication with each other, said image data being comprised of a plurality of image elements each individually parameterized by display values in a display value set individually associated with that picture element, said display values comprising a color tone value, a saturation value, and a brightness value that collectively define an individual visual appearance of that image element when displayed, in order to make all of said image elements visually discernable against a display background at said display device of said data source computer, said method comprising the steps of:

(a) copying said image data on the data source computer and transmitting a modified version of said image data from the data source computer to the data query computer via the network;

(b) receiving said image data from the data source computer at the data query computer and, at the data query computer, presenting said modified version of said image data at the display device of the data query computer;

(c) repeating steps (a) and (b) at times selected from the group consisting of regular intervals and upon alteration of said image data; and (d) generating said modified version of said image data in order to prevent visual discernment of a portion of said image data in said presentation of said image data at said data query computer, by selectively discriminating among said plurality of image elements dependent on at least one of the display values in the display value set by excluding, in step (a), transmission of display values for any of said plurality of image elements that respectively have display values in a predetermined range around a predetermined display value set, to cause said portion of said image data to be visually non-discernable against a background at said display device of said data query computer.

2. A method as claimed in claim 1 comprising employing, as said display values in said display value set, an R-value, a G-value, and a B-value in an RGB display value set.

3. A method as claimed in claim 2 comprising employing, as a further display value in said display value set, a transparency display value, and including said transparency value in said predetermined range around said predetermined display value set used to exclude transmission of display values in step (a).

4. A method as claimed in claim 1 comprising replacing any display value sets that have been excluded from transmission in step (a) with respective display value sets of image elements that are adjacent in said image data to image elements having display value sets that were excluded from transmission.

5. A method as claimed in claim 1 comprising generating said modified version of said image data by excluding presentation at said display device of said data query computer of any image elements having a predetermined display value set within a closed curve.

6. A method as claimed in claim 5 comprising replacing any image elements at said display device of said data query computer having a display value set within said closed curve with image elements having a predetermined display value set.

7. A method as claimed in claim 6 wherein said image data are comprised of input fields having respective background colors, and comprising employing, as said predetermined display value set, a display value set representing a background color substantially corresponding to the background color of one of said input fields.

8. A method as claimed in claim 1 comprising giving selected image elements in said plurality of image elements a special display value set that does not correspond to respective display value sets of a remainder of said plurality of image elements, and comprising, in step (d), discriminating the image elements that are presented at said display device of said data query computer by excluding display of any image elements having said special display value set.

* * * * *